July 31, 1923.
E. L. LANFAIR
CLOSURE PLUG
Filed Nov. 18, 1921
1,463,426
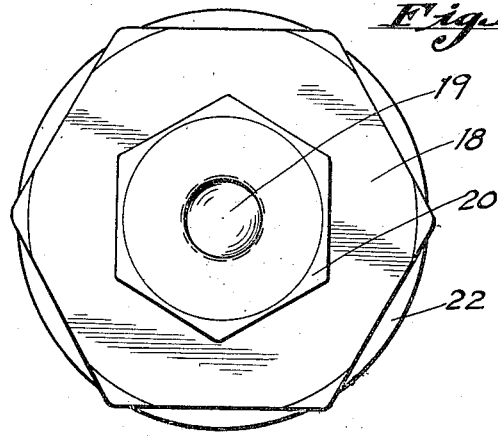
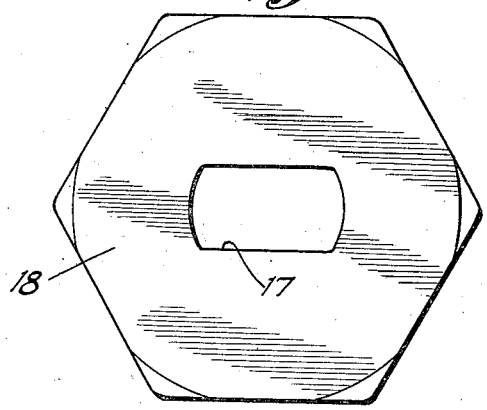
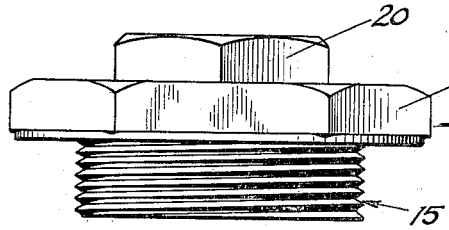
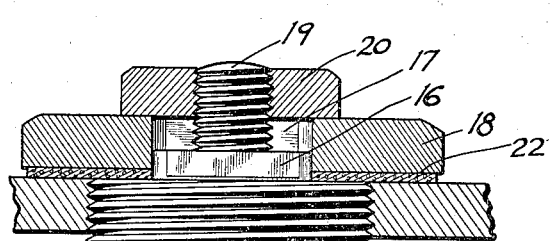
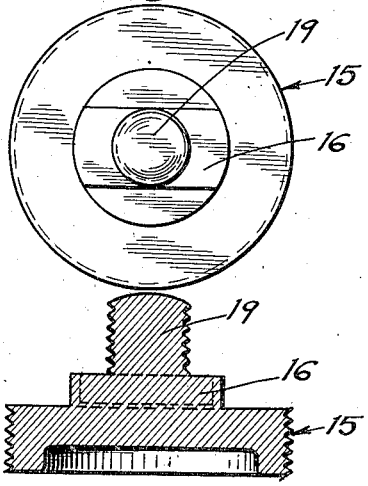
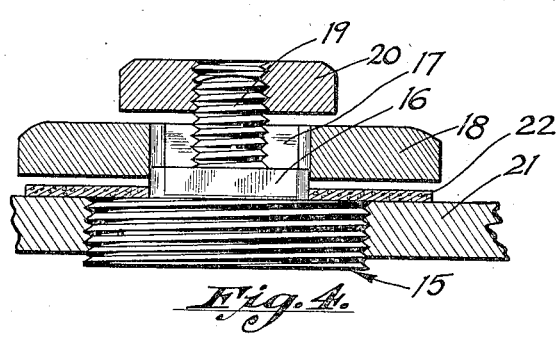
INVENTOR.
ERNEST L. LANFAIR.
BY Hazard & Miller
ATTORNEYS.

Patented July 31, 1923.

UNITED STATES PATENT OFFICE.

ERNEST L. LANFAIR, OF SAWTELLE, CALIFORNIA.

CLOSURE PLUG.

Application filed November 18, 1921. Serial No. 516,064.

*To all whom it may concern:*

Be it known that I, ERNEST L. LANFAIR, a citizen of the United States, residing at Sawtelle, in the county of Los Angeles and State of California, have invented new and useful Improvements in Closure Plugs, of which the following is a specification.

My invention relates to closure plugs for gasoline tanks and the like, and a purpose of my invention is the provision of a closure plug which, while being fluid tight, will not bind when in sealing position so as to allow of the ready removal thereof.

I will describe one form of closure plug embodying my invention, and will then point out the novel features thereof in claims.

In the accompanying drawings,

Figure 1 is a view showing in top plan one form of closure plate embodying my invention.

Fig. 2 is a view showing in side elevation the closure plate shown in Fig. 1.

Fig. 3 is a vertical sectional view of the closure plug in applied position within a tank.

Fig. 4 is a view similar to Fig. 3 with the plug in partly released position.

Fig. 5 is a detail view showing in top plan the operating nut comprised in the plug shown in the preceding views.

Fig. 6 is a top plan view of the plug comprised in the closure plug shown in the preceding views.

Fig. 7 is a vertical sectional view of the same.

Similar reference characters refer to similar parts in each of the several views.

Referring specifically to the drawings, my invention, in its present embodiment, comprises a screw-threaded plug 15 having formed on its upper side an elongated projection 16 which is adapted to fit within a correspondingly shaped recess 17 formed eccentrically of an operating nut 18. Arranged axially of the plug 15 and projecting upwardly from the projection 16 is a threaded shank 19 which is of such a length as to project from the upper side of the nut 18 when the two are assembled as shown in Fig. 3. The upper end of the shank 19 receives a nut 20 which is designed to operate the nut 18.

In the applied position of the closure plug as shown in Fig. 4, the plug 15 fits within the usual opening of the tank 21, the diameter of the nut 18 being such as to overlap the edges of the tank opening. Beneath the nut 18 and embracing the projection 16, is a gasket 22 which operates to effectively seal the closure when the nut is in applied position. When moving the plug to sealing position, the nut 20 is screwed downwardly on the shank 19 until it abuts the nut 18 whereby upon further movement the nut 18 is forced downwardly against the gasket 22 thereby effecting the fluid tight seal, while at the same time not bringing the nut 18 in contact with the tank 21. This is of special advantage in applying the plug to a gasoline tank which has been recently painted, as with plugs heretofore proposed, the paint operates to bind the nut and thus prevent unscrewing of the plug. However, in the present instance the gasket 22 is of such a size as to prevent the nut from actually contacting with the tank.

In Fig. 3 the nut 20 is shown screwed home so that the nut 18 effectively seals the joint between the plug and tank. To remove the plug it is necessary to first loosen the nut 20 sufficiently to allow free rotation of the nut 18. A wrench may now be applied to the nut 18, and when such nut is rotated an unscrewing of the plug 15 is effected through the medium of the projection 16.

Although I have herein shown and described only one form of closure plug embodying my invention, it is to be understood that various changes and modifications may be made herein without departing from the spirit of the invention and the spirit and scope of the appended claims.

What I claim is:

1. A closure plug comprising a screw plug, an angular projection formed in one side of the plug, a screw-threaded shank projecting from the projection, a washer mounted on the projection side of the plug, an operating nut having a socket which receives and is of the same shape as said projection, and a nut mounted on said shank and arranged to engage said operating nut.

2. A closure plug comprising a plug portion, a nut for operating the plug and mounted for sliding movement with relation to the plug, and means for securing the nut against rotation.

3. In combination, a tank having an opening and a closure plug including a screw plug portion threadedly fitted in the opening, a projection on the outer side of the plug portion, a screw-threaded shank extending from the projection, an operating nut having an opening for receiving said projection whereby rotation of the plug portion can be effected by said nut, a gasket sustained on the plug and interposed between said nut and tank, and a second nut mounted on the shank and adapted to engage the first nut for forcing the latter against said gasket.

4. A closure plug comprising a screw plug, an angular projection formed in one side of the plug, a screw-threaded shank projecting from the projection, an operating nut having a socket which receives and is of the same shape as said projection, and a nut mounted on said shank and arranged to engage said operating nut.

5. In combination, a tank having an opening and a closure plug including a screw plug portion threadedly fitted in the opening, a projection on the outer side of the plug portion, a screw-threaded shank extending from the projection, an operating nut having an opening for receiving said projection whereby rotation of the plug portion can be effected by said nut, and a second nut mounted on the shank and adapted to engage the first nut for forcing the latter against the tank.

In testimony whereof I have signed my name to this specification.

ERNEST L. LANFAIR.